United States Patent [19]

Hara et al.

[11] 4,053,209

[45] Oct. 11, 1977

[54] ELECTROCHROMIC DEVICE

[75] Inventors: Toshitami Hara, Tokyo; Yoshioki Hajimoto, Chofu; Yoshiaki Shirato; Masaaki Matsushima, both of Yokohama, all of Japan

[73] Assignee: Canon Kabushiki Kaisha, Tokyo, Japan

[21] Appl. No.: 635,427

[22] Filed: Nov. 26, 1975

[30] Foreign Application Priority Data

| Nov. 27, 1974 | Japan | 49-136847 |
| Apr. 4, 1975 | Japan | 50-40910 |
| July 9, 1975 | Japan | 50-84076 |
| June 23, 1975 | Japan | 50-77185 |
| June 18, 1975 | Japan | 50-73854 |

[51] Int. Cl.² .............................................. G02F 1/16
[52] U.S. Cl. ............................................. 350/160 R
[58] Field of Search ................................. 350/160 R

[56] References Cited

U.S. PATENT DOCUMENTS

| 3,589,896 | 6/1971 | Wilcox | 350/160 R |
| 3,712,710 | 1/1973 | Castellion | 350/160 R |

OTHER PUBLICATIONS

Hampel, Encyclopedia of Chemical Elements (Reinhold, New York), 1969, pp. 199-203.

*Primary Examiner*—William L. Sikes
*Attorney, Agent, or Firm*—Fitzpatrick, Cella, Harper & Scinto

[57] ABSTRACT

An electrochromic device for use in a display apparatus which is basically constructed with an electrochromic layer containing therein a metal oxide compound, an auxiliary electrochromic layer containing therein at least one kind of metal compound which contains at least one kind of metal element, wherein the difference in electro-negativity between the metal element in the metal compound and the metal element contained in the metal oxide constituting the electrochromic layer is 0.4 or less, both the electrochromic layer and the auxiliary electrochromic layer being laminated, and a pair of electrodes holding between them the laminated electrochromic layer and auxiliary electrochromic layer, at least one of the pair of electrodes being light transmissive.

28 Claims, 3 Drawing Figures

ELECTROCHROMIC DEVICE

BACKGROUND OF THE INVENTION

1. Field of the Invention

This invention relates to a display device utilizing an element which exhibits the so-called electrochromic phenomenon.

Research and development of such electrochromic element have recently been flourishing owing to its versatility in construction, persistence or memorizability thereof from its color forming (or discoloration) to its extinction, availability of various materials for such element, the color tone of which changes in correspondence to variations in applied voltage values, and so forth.

Typical examples of its application are: electronic desk calculators, horological instruments, etc., in which it is used as the element for indicating numerals, characters, and symbols; sign boards; meteorological charts, traffic sign boards, X-ray image display boards, etc., in which it is used as the element for displaying images in general; soft facsimile display bodies capable of being used repeatedly by erasure as a light shutter or facsimile signal recording; and writing boards, capable of being inscribed or erased in the same way as the ordinary blackboards.

2. Description of the Prior Arts

By the term "electrochromic phenomenon" is generally meant a reversible coloring and decoloring phenomenon depending on electric polarity, wherein the coloring (or discoloring) takes place by application of electricity, and the decoloring occurs by application of electricity having a polarity opposite to that of the abovementioned electric current applied at the time of the coloring or color forming, or by heat application, or a combination of both electric and heat applications. In an actual displaying element, however, it is possible to cause the color forming (or electrochromic phenomenon) without depending on the apparent electric polarity.

The mechanism for the electrochromic phenomenon is not always simple. As one of several views heretofore made, the phenomenon is understood to be due to the so-called oxidation-reduction reaction between an electrolyte and a color forming (electrochromic) substance. In this case, the electrolyte and the electrochromic substance are not necessarily different from each other from the standpoint of the constituent material. Therefore, it may sometimes occur that one and the same substance constitutes the electrochromic substance and simultaneously the electrolytic substance. Also, from another standpoint, there is such a view that the phenomenon takes place due to variations in the light absorbing characteristics of the injected electrons which have been injected into the center of the color as is the case with photochromy. In reality, the result of the combination of these various occurrences is understood to be the cause for the electrochromic phenomenon.

Since the electrochromic phenomenon is caused by electrically changing the color which the material possesses inherently, the possible combinations of colors are innumerable. Further, whether the material is capable of transmitting light or not, or whether it is capable of reflecting or scattering the light or not, is not determined by the property of the material per se, but is determined by the method of forming the layer. Consequently, when the material is to be used as a display apparatus, both the light-transmission type and reflection type may be formed. Incidentally, one of the fundamental constructions of the element which exhibits the electrochromic phenomenon is disclosed in U.S. Pat. No. 3,521,941 (Deb et al.). The element as taught in this patent is such a construction that a current carrier permeable insulator is laminated on an electrochromic layer using a transition metal compound such as $WO_3$, $MoO_3$, etc., and the laminated layers are held between a pair of electrodes. For the current carrier permeable insulator as seen in this patented element, there are used various resin films such as polyester, etc., $CaF_2$, $SiO_2$, $MgF_2$, and so on. It is difficult to say that these compounds, however, are satisfactory for practical use in view of the inferiority in the electrochromic efficiency of the element per se, the displayed color density, and response time, in which points there still exists room for further improvement. By the term "electrochromic efficiency" as used herein is meant a proportional constant between the variation in color density and the quantity of injected charge, since the variation in color density in this element is determined by the quantity of the charge injected into this element.

SUMMARY OF THE INVENTION

It is therefore a primary object of the present invention to provide an electrochromic device for use in a display device utilizing an element which exhibits the electrochromic phenomenon, in which the electrochromic efficiency has been improved to an extent that a high density electrochromy or color development can be acheived in an extremely brief period of time.

It is another object of the present invention to provide an electrochromic device capable of displaying light information in the form of a color developed image with a high image resolution.

It is still another object of the present invention to provide an electrochromic device which provides good "appearance" of the image display.

According to the present invention, there is provided an electrochromic device comprising an electrochromic layer containing therein a compound selected from the group consisting of $WO_3$, $MoO_3$, and $TiO_2$, an auxiliary electrochromic layer containing therein at least one kind of metal compound containing therein at least one kind of metal element wherein the difference in electronegativity between the metal W, MO or Ti and at least one metal element in the metal compound constituting the auxiliary electrochromic layer is 0.4 or less, both the electrochromic layer and auxiliary electrochromic layer being laminated, and a pair of electrodes holding therebetween the laminated electrochromic layer and auxiliary electrochromic layer, at least one of the pair of electrodes being light-transmissive.

The foregoing objects, other objects, and the construction and function of the electrochromic device according to the present invention will become more apparent from the following detailed description of the invention, when read in conjunction with the accompanying drawing and several preferred examples.

DESCRIPTION OF THE PREFERRED EMBODIMENTS

Figure 1:
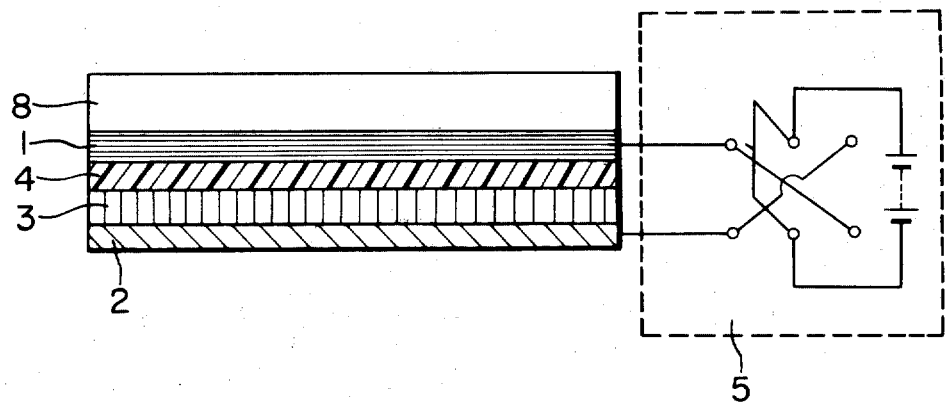
FIGS. 1, 2 and 3 schematically illustrate the structure of the electrochromic device according to the present invention.

Referring to FIG. 1, which shows one embodiment of the electrochromic device according to the present invention, the basic construction of the element is such that an electrochromic layer 3 and an auxiliary electrochromic layer 4 are held between a pair of opposing electrodes 1 and 2, at least one of which is made light transmissive. A component 5 enclosed by a dash line schematically shows an electrical circuit for such electrochromic device.

For the light transmitting electrode (in this case, electrode 1), there can be used a light transmitting film of electrically conductive metal oxide such as, for example, tin oxide ($SnO_2$), indium oxide ($In_2O$), etc.; before semi-light-transmitting metal thin film; a metal thin film provided thereon with a reflection reducing coatings; or an electrically conductive transparent resin film, and so on.

In the case of using the light transmitting film of electrically conductive metal oxide, there has already been reported a problem such that the film itself takes part in the electrochromic phenomenon, as a result of which, when the display element of a type wherein the auxiliary electrochromic layer is directly laminated on the light transmitting film of the electrically conductive metal oxide is to be operated, unnecessary coloring and decoloring are repeated to cause such undesirable coloring to remain to bring about lowering in the intended performance in display. In view of such deficiency, it is advantageous for the purpose of the present invention to use a metal thin film provided thereon with the reflection reducing coating.

For the metal thin film, a vapor-deposited film of a metal liable to the least chemical change such as gold (Au), palladium (Pd) and other precious metals may preferably be used. The optimum film thickness may range from 50 to 200 angstroms in consideration of the electrical resistance and light absorbing characteristics of the metal film.

For the reflection reducing coating, there can be used such compounds as, for example, ZnS, $ZrO_2$, $TiO_2$, SiO, $SiO_2$, $Nb_2O_5$, MgO, $MgF_2$, $CaF_2$, $Al_2O_3$, $Bi_2O_3$, $CeO_2$, and so on. The thin film obtained from these compounds has a refractive index of from 1.3 to 3.0 and a film thickness of from 100 to 1200 angstroms. In case the refractive index of the thin film is 2.0, the optimum film thickness may range from 400 to 600 angstroms, whereby the reflexibility can be reduced from 30% to 5%.

Thus, by reducing or minimizing deterioration in the electrode element to increase the number of times for repeated use of the device, and further by reducing the surface reflection, the so-called "appearance" of the display can be improved.

The material constituting the non-transmitting electrode (in this case, electrode 2) opposite the light transmitting electrode 1 is not particularly limited. That is, when the display device of the reflection type is to be constructed, metals such as silver (Ag), aluminum (Al), and so forth may be used.

The electrochromic layer 3 for use in the present invention is formed by vapor-depositing any one of $WO_3$, $MoO_3$, and $TiO_2$ to a film thickness ranging from 500 angstroms to 10 $\mu$m (preferably from 2000 angstroms to 1$\mu$m) from the standpoint of the electrochromic efficiency based on the interrelationship with the material to be used for the auxiliary electrochromic layer.

The auxiliary electrochromic layer 4 for use in the present invention is formed by vapor-depositing, to a film thickness of from 100 angstrom to 10$\mu$m (preferably from 1000 angstroms to 1$\mu$m), at least one kind of metal compound which is selected from $ZrO_2$, $Ta_2O_5$, $Nb_2O_5$, $V_2O_5$, $TiO_2$, $ZrO_2$ containing therein $Y_2O_3$, $SrTiO_3$, $BaTiO_3$, $CaTiO_3$, AgI, $Ag_2S$, $Ag_3SI$, $Ag_3SBr$, $Ag_6I_4$, $WO_4$, $\beta$-$Al_2O_3$, and so forth that have been verified to be particularly effective for the purpose of the present invention, and which contains at least one kind of metal element such as, for example, Ta, Zr, Nb, V, Ag, Sr, Ti, etc., wherein the difference in electronegativity between the W, Mo or Ti in the electrochromic layer and at least one metal in the metal compound of the auxiliary electrochromic layer is 0.4 or less. The term "electronegativity" as used herein has been well defined by Pauling in his article titled "The Nature of Chemical Bond", published from Cornell Univ. Press, N.Y., 1960.

In the description which follows, one embodiment of a device, in which the electrochromic device of the present invention is developingly applied to the recording and displaying of a light image, will be explained in reference to FIG. 2. As in seen from the drawing, the basic structure of the element is the same as that shown in FIG. 1 with the exception that a photosemiconductive layer 6 is further added.

The photo-semiconductive body or layer 6 for the purpose of the present invention is not limited only to those substances, whose electrical conductivity varies by visible light rays, but those substances whose electric conductivity varies with irradiation of light in other wavelength regions such as, for example, ultraviolet rays, infrared rays, and so on may also be used. For instance, oxides, sulfides, and selenides, etc. of zinc (Zn) and cadmium (Cd) can be used for this purpose.

Figure 3:
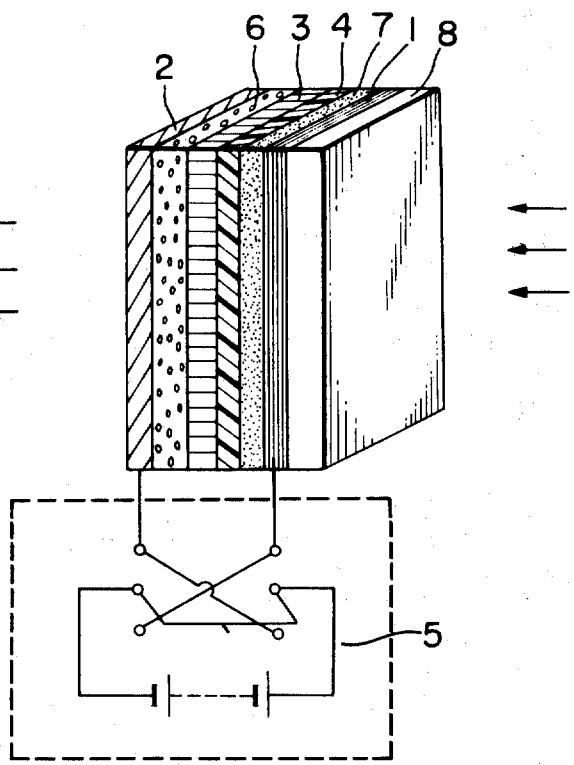

Also, in another embodiment of the electrochromic device of a construction as shown in FIG. 3, wherein the electrochromic layer 3 and the auxiliary electrochromic layer 4 are held between the photo-semiconductive layer 6 and another photo-semiconductive layer 7, electricity can flow directly from one electrode toward the other as if it were absorbed into the latter, because the mutually opposing electrodes are so closely positioned that the difference in density of the light image pattern at one of the pair of the photo-semiconductive layers can be truthfully converted into the pattern onto the other layer in accordance with the magnitude of electrical resistance corresponding to the image pattern at the one electrode, whereby the so-called "blurring" due to expansions of electric field can be avoided as in the embodiment where a single photo-semiconductive layer is used, As the result, an electrochromic pattern of a high resolving power can be displayed.

The substrate 8 as shown in the drawing is usually employed for supporting the laminar structure as well as for protecting the surface layer.

Figure 2:
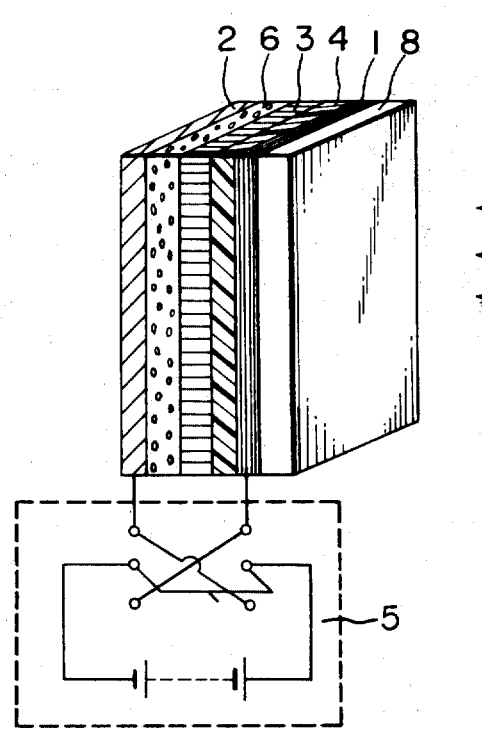

In the foregoing explanations in reference to FIGS. 1, 2, and 3, the so-called reflection type display apparatus has been exemplified. It should, however, be noted that the light transmission type display device is also within the scope of the present invention.

Incidentally, in one embodiment of the display device, wherein the directions of an input light pattern which is an image information and of observing the displayed image pattern are the same, i.e., the reflection type display device, attention should be given in the display operation such that the light information alone is put in at the dark room, or the wavelength range of an input light is set at a range outside the visible wavelength region, and so on. In view of such circumstances, another embodiment of the device wherein the direction of input information and the direction of observing the displayed image pattern are mutually opposed for the display operation, i.e., light transmission type display device, is considered advantageous. Even in this case, however, attention must be given as to minimizing the amount of incident light onto the background, since the contrast in the displayed image is inconveniently lowered, if the components of the device are all light transmissive. In such case, favorable results can be obtained, when a mixture consisting of the effective component constituting any of the electrochromic layer, the auxiliary electrochromic layer and the photo-semiconductive layer, and a binder is coated on any of such electrochromic layer, the auxiliary electrochromic layer, and the photo-semiconductive layer to a film thickness of 1 to 100$\mu$m so that it may have the light-intercepting property.

In order to enable persons skilled in the art to put the present invention into practice, several preferred examples are presented hereinbelow. It should, however, be understood that these examples are illustrative only and not so restrictive, and that changes and modifications may be made by those skilled artisans to this invention size of 1 cm $\times$ 1 cm, thereby completing production of the display element.

When electric current was applied across the gold electrode and the aluminum electrode in such a manner that the former becomes positive in polarity, a blue-colored pattern corresponding to the pattern on the aluminum electrode could be observed on the white background. Even after stoppage of the electric current application, this colored pattern remained on the background, which was extinguished by application of electric current of an opposite polarity. The variations in color density in the coloring and decoloring processes with respect to the quantity of electric current applied (mA. sec./cm$^2$) in this element are as shown in the following Table 1.

Separately, BaTiO$_3$ used in the abovementioned element was substituted for the materials as shown in Table 1 below to produce various display elements in exactly the same manner as above. By electric current application in the same manner as above, a blue-colored pattern was observed without exception. The variations in color density in the coloring and decoloring processes with respect to the quantity of the current application (mA. sec./cm$^2$) are also shown for these various materials in the same Table 1.

The data in the Table below were calculated in such a way that the color density in the non-colored state is set as 0, and the color density when the reflexibility becomes 1/10 and 1/100 is set at 1.0 and 2.0 respectively.

Table 1

| Model No. | Components Constituting Element | Quantity of Electric Current Applied (mA.sec./cm$^2$) | Coloring Process | | | | | | Decoloring Process | | | | | |
|---|---|---|---|---|---|---|---|---|---|---|---|---|---|---|
| | | | 2 | 4 | 6 | 8 | 10 | 12/0 | 2 | 4 | 6 | 8 | 10 | 12 |
| 1 | ZnS/Au/BaTiO$_3$/WO$_3$/ZnO(B)(*)/Al | " | 0.07 | 0.11 | 0.15 | 0.18 | 0.21 | 0.24 | 0.13 | 0.03 | 0.02 | 0.01 | 0.01 | 0.00 |
| 2 | " V$_2$O$_3$ | " | 0.09 | 0.15 | 0.25 | 0.35 | 0.45 | 0.55 | 0.24 | 0.10 | 0.02 | 0.02 | 0.02 | 0.02 |
| 3 | " TiO$_2$ | " | 0.13 | 0.22 | 0.32 | 0.39 | 0.46 | 0.50 | 0.36 | 0.22 | 0.06 | 0.00 | — | — |
| 4 | " Nb$_2$O$_5$ | " | 0.15 | 0.31 | 0.39 | 0.45 | 0.52 | 0.56 | 0.44 | 0.35 | 0.33 | 0.33 | 0.32 | 0.32 |
| 5 | " CaTiO$_3$ | " | 0.04 | 0.07 | 0.09 | 0.11 | 0.12 | 0.13 | 0.10 | 0.07 | 0.04 | 0.02 | 0.00 | — |
| 6 | " SrTiO$_3$ | " | 0.07 | 0.10 | 0.11 | 0.12 | 0.13 | 0.13 | 0.04 | 0.01 | 0.00 | — | — | — |
| 7 | " Ta$_2$O$_5$+ZrO$_2$ | (***)/Al | 0.29 | 0.50 | 0.69 | 0.85 | 0.99 | 1.10 | 0.87 | 0.66 | 0.44 | 0.15 | 0.01 | 0.00 |
| 8 | " CaTiO$_3$+SrTiO$_3$ | (****)/Al | 0.10 | 0.13 | 0.15 | 0.17 | 0.18 | 0.19 | 0.10 | 0.05 | 0.02 | 0.00 | — | — |
| 9 | " ZrO$_2$+Y$_2$O$_3$ | (*****)/Al | 0.23 | 0.41 | 0.52 | 0.63 | 0.72 | 0.80 | 0.65 | 0.41 | 0.19 | 0.02 | 0.00 | — |
| 10 | " ZrO$_2$ | " | 0.25 | 0.44 | 0.57 | 0.69 | 0.79 | 0.88 | 0.76 | 0.53 | 0.35 | 0.12 | 0.00 | — |
| 11 | " Ta$_2$O$_5$ | " | 0.31 | 0.52 | 0.69 | 0.83 | 0.95 | 1.06 | 0.90 | 0.74 | 0.50 | 0.18 | 0.02 | 0.00 |
| 12 | " CaF$_2$ | (**)/Al | 0.03 | 0.05 | 0.07 | 0.09 | 0.10 | 0.11 | 0.08 | 0.05 | 0.02 | 0.00 | — | — |

(Note)
(*)"(B)" denotes a mixture with an organic binder.
(**)Model No. 12 is not within the scope of the present invention. It is shown only for the purpose of comparison.
(***)The mixing ratio of Ta$_2$O$_5$+ZrO$_2$ is 1 mol : 3 mol.
(****)The mixing ratio of CaTiO$_3$+SrTiO$_3$ is 1 mol : 1 mol.
(*****)ZrO$_2$+Y$_2$O$_3$ contains 10 mol % of Y$_2$O$_3$.

without departing from the spirit and scope of the present invention as recited in the appended claims.

PREFERRED EXAMPLES

Example 1

Zinc sulfide (Zns) as a reflection reducing coating was vapor-deposited onto a substrate of glass to a film thickness of 400 angstroms, thereafter Au; BaTiO$_3$, and WO$_3$ were sequentially laminated onto this reflection reducing coating by vapor-deposition using an electron beam to a film thickness of 80 angstroms, 3,000 angstroms, and 6,000 angstroms, respectively. Subsequently, a paint prepared by mixing and dispersing 10 parts by weight of ZnO which has been rendered electrically conductive and 2 parts by weight of ethyl cellulose as a binder was applied onto the vapor-deposited layers. After drying the coating to have a final film thickness of 20$\mu$m, it was made the light dispersion layer of white background. Finally, aluminum as the opposite electrode was vapor-deposited in a pattern of a As will be apparent from the above Table, the electrochromic efficiency (a ratio of the quantity of electric current application required for coloring to a certain definite color density) of the element according to the present invention has been improved by the use of the above enumerated materials for the auxiliary electrochromic layer, in comparison with the case where the material such as CaF$_2$ as has been used heretofore is utilized.

Example 2

The exact same procedure as in Example 1 above was followed for the production of the display element, except for the use of AgI, Ag$_2$S, Ag$_3$SI, Ag$_3$SBr, Ag$_6$I$_4$·WO$_4$ for constructing the auxiliary electrochromic layer (film thickness of up to 3000 angstroms by vapor-deposition).

When the thus produced elements were subjected to coloring and decoloring tests under the same conditions as in Example 1 above, it was found that such coloring and decoloring could be done in a shorter period of time and at a lower voltage than those of the element, in which $CaF_2$ is used as the material for the auxiliary electrochromic layer.

Example 3

Onto a "nesa" glass (a glass having on its surface a vapor-deposited layer of $SnO_2$), $WO_3$ and $BaTiO_3$ were sequentially vapor-deposited by means of an electron beam to a film thickness of 6000 angstroms and 3000 angstroms, respectively, to form a laminated layer structure. Thereafter, gold (Au) as the opposite electrode was vapor-deposited on the layered structure in a pattern of a size of 1 cm × 1 cm to a film thickness of 80 angstroms, on which there was further vapor-deposited $ZrO_2$ to a film thickness of 520 angstroms to make it the reflection reducing coating. In this way, a display element, in which all the components constituting the same were made light transmissive, was obtained.

When electric current was applied across the gold electrode and the "nesa" electrode with the gold electrode being in the positive polarity, there was obtained a blue-colored pattern corresponding to the pattern on the gold electrode. Even after stoppage of the electric current application, this colored pattern remained as it had been, which could be extinguished only by application of electric current having an opposite polarity.

The electrochromic efficiency of the element was extremely satisfactory in comparison with the conventional element.

Example 4

$ZrO_2$ and $MoO_3$ were sequentially vapor-deposited by electron beam onto the "nesa" glass to a film thickness of 3000 angstroms and 6500 angstroms, respectively, so as to form a laminated layer structure. Thereafter, a mixture consisting of 9 parts by weight of ZnO powder and 1 part by weight of ethyl cellulose as a binder was coated on this laminar structure. The thus obtained display element was held between mutually opposing aluminum electrodes. Incidentally, the abovementioned mixture was treated for increased sensitivity to coloring matter with rose bengal.

A light image was formed on the ZnO containing layer (i.e., photoconductive layer) followed by application of an electric voltage of 10 volts across the "nesa" electrode and the aluminum electrode with the aluminum electrode side being in the negative polarity. Upon the electric current application, a blue-colored pattern in conformity to the light image pattern was recorded on the display element. This image did not change at all even after removal of the voltage applied thereto. The, when a voltage of 10 volts was applied to the element with the aluminum electrode side being in the positive polarity, while irradiating the entire surface of the element with light rays, the recorded pattern was quickly extinguished.

Variations in color density on the element, when electric current of 10 volts was applied thereto under light irradiation at 200 lux are shown in Tables 2 and 3 below.

Table 2

| Components Constituting Element | Time (sec) Voltage (V) | (At Time of Coloring) | | | | | | | |
|---|---|---|---|---|---|---|---|---|---|
| | | 0 | 0.2 | 0.5 | 1 | 2 | 5 | 10 | 20 |
| Nesa/$ZrO_2$/$MoO_3$/ZnO(B)(*)/Al | 10 | 0 | 0.3 | 0.6 | 1.0 | 1.5 | 1.6 | 1.6 | 1.6 |

(NOTE) "(*)(B)" denotes a mixture with an organic binder.

Table 3

| Components Constituting Element | Time (sec) Voltage (V) | (At Time of Decoloring) | | | | | | | |
|---|---|---|---|---|---|---|---|---|---|
| | | 0 | 0.2 | 0.5 | 1 | 2 | 5 | 10 | 20 |
| Nesa/$ZrO_2$/$MoO_3$/ZnO(B)(*)/Al | 10 | 1.5 | 1.0 | 0.6 | 0.2 | 0.0 | 0.0 | — | — |

(NOTE) "(*)(B)" denotes a mixture with an organic binder.

The data in the above Tables were calculated in such a way that the color density in the non-colored state is set as 0, and the color density, when the reflexibility becomes 1/10 and 1/100, is set at 1.0 and 2.0 respectively.

As will be apparent from the above Tables, it has been verified that the display element according to the present invention is capable of coloring at a high density with application of electric current in a short period of time, and also of extinguishing such colored image in a very short period of time.

Also, when $WO_3$ and $TiO_2$ were used in place of $MoO_3$ as used in the abovementioned element to produce different elements, and such elements were subjected to the coloring and decoloring treatments under exactly the same conditions as in the foregoing, similar results could be obtained.

Example 5

Onto a semi-light-transmitting film (film thickness of 80 angstroms), $Ta_2O_5$ and $WO_3$ were sequentially vapor-deposited to a film thickness of 3000 angstroms and 6500 angstroms, respectively, to form a laminated layer structure. Onto this laminated layer structure, there was further applied a mixture consisting of 8 parts by weight of ZnO powder and 2 parts by weight of Novolac type phenolic resin to a film thickness of 20 $\mu$m. Thereafter, the laminated structure was held between the opposing electrodes of aluminum. Incidentally, the mixture used for coating the laminated layer structure was treated for increased sensitivity to coloring matter with rose bengal.

When a light image was formed on the photoconductive layer (the ZnO containing layer) of the display element and then an electric current of 15 volts was impressed on this element with the aluminum electrode being in the negative polarity, there could be recorded a blue-colored pattern in conformity to the light image pattern. This recorded image did not change at all even after removal of the voltage. When a voltage of 15 volts was impressed on the element with the aluminum electrode being in the positive polarity, while irradiating light over the entire surface of the element, the recorded pattern was quickly extinguished.

Variations in color density on the element, when a voltage of 15 volts was applied thereto under the light irradiation at 200 lux, are shown in Tables 4 and 5 below.

in conformity to the light image pattern. This colored image did not change at all even after removal of the voltage applied. Also, when an electric current of 20 volts was impressed on the element with the aluminum electrode being in the negative polarity, while irradiating light over the entire surface of the element, the recorded pattern was quickly extinguished.

For the purpose of comparison, a comparative element of the same structure was produced by the use of $CaF_2$ in place of $Ta_2O_5$.

Using these two kinds of a elements, variations in the

Table 4

| Components Constituting Element | Time (sec) Voltage (V) | (At Time of Coloring) | | | | | | | |
|---|---|---|---|---|---|---|---|---|---|
| | | 0 | 0.2 | 0.5 | 1 | 2 | 5 | 10 | 20 |
| $Au/Ta_2O_5/WO_3/ZnO(B)^{(*)}/Al$ | 15 | 0 | 0.4 | 0.7 | 1.2 | 1.7 | 1.8 | 1.8 | 1.8 |

(NOTE)
(*)"(B)" denotes a mixture with an organic binder.

Table 5

| Components Constituting Element | Time (sec) Voltage (V) | (At Time of Decoloring) | | | | | | | |
|---|---|---|---|---|---|---|---|---|---|
| | | 0 | 0.2 | 0.5 | 1 | 2 | 5 | 10 | 20 |
| $Au/Ta_2O_5/WO_3/ZnO(B)^{(*)}/Al$ | 15 | 1.0 | 0.5 | 0.2 | 0.0 | 0.0 | — | — | — |

(NOTE)
(*)"(B)" denotes a mixture with an organic binder.

The value of the color density was determined in accordance with Example 4.

From the above Tables, it has been found out that, by the use of the element of the structure as in this Example, an image having a high contrast could be recorded and extinguished in an extremely short period of time.

color density were compared under irradiation of light of 2000 lux to the elements, while applying a voltage of 20V and 50V, respectively. The results are shown in the following Tables 6 and 7.

Table 6

| | Components Constituting Element | Time (sec) Voltage (V) | 0 | 0.5 | 1 | 2 | 5 | 10 | 20 | 50 |
|---|---|---|---|---|---|---|---|---|---|---|
| Invention | $Nesa/WO_3/Ta_2O_5/CdS(B)^{(*)}/Al$ | 20 | 0 | 0.3 | 0.5 | 0.7 | 1.0 | 1.2 | 1.3 | 1.4 |
| Comparison | $Nesa/WO_3/CaF_2/CdS(B)^{(*)}/Al$ | 20 | 0 | — | 0 | 0 | 0 | 0.1 | 0.1 | 0.2 |
| Invention | $Nesa/WO_3/Ta_2O_5/CdS(B)^{(*)}/Al$ | 50 | 0 | 0.7 | 1.0 | 1.5 | 1.8 | 2.0 | 2.1 | 2.1 |
| Comparison | $Nesa/WO_3/CaF_2/CdS(B)^{(*)}/Al$ | 50 | 0 | — | 0 | 0.1 | 0.2 | 0.3 | 0.4 | 0.5 |

(NOTE)
(*) "(B)" denotes a mixture with an organic binder.

Table 7

| | Components Constituting Element | Time (sec) Voltage (V) | 0 | 0.5 | 1 | 2 | 5 | 10 | 20 | 50 |
|---|---|---|---|---|---|---|---|---|---|---|
| Invention | $Nesa/WO_3/Ta_2O_5/CdS(B)^{(*)}/Al$ | 20 | 1.5 | 1.0 | 0.2 | 0.0 | — | — | — | — |
| Comparison | $Nesa/WO_3/CaF_2/CdS(B)^{(*)}/Al$ | 20 | 0.6 | 0.4 | 0.3 | 0.2 | 0.1 | 0.0 | — | — |

(NOTE)
(*)"(B)" denotes a mixture with an organic binder.

Example 6

Onto a Nesa electrode, $WO_3$ and $Ta_2O_5$ were vapor-deposited sequentially by means of an electron beam to a film thickness of 6500 and 3000 angstroms, respectively, to form a laminated layer structure. Further, a mixture consisting of a CdS powder, vinyl acetate and acrylic resins was coated on this laminated structure to a film thickness of 30μm, after which the structure was held between opposing electrodes of aluminum.

When a light image was formed on the photoconductive layer of the then obtained display element, and then an electric current of 20 volts was applied to the element with the aluminum electrode being in the positive polarity, there could be recorded a blue-colored pattern The data in the above Tables were calculated in such a manner that the color density in the non-colored state is set a 0, and the color density, when the reflective index becomes 1/10 and 1/100, is set at 1.0 and 2.0, respectively.

As will be apparent from the above Tables, it has been verified that the element according to the present invention is capable of coloring at a high density with electric current application in a much shorter time, and of decoloring the image in a shorter time period, than in the heretofore known display element.

Moreover, $MoO_3$ and $TiO_2$ were used in place of $WO_3$ in manufacturing different kinds of display elements, which were subjected to the coloring and decoloring operations under the same conditions as above. Similar results could be obtained.

Example 7

On a "nesa"-coated glass, there was formed a coating layer of ZnO by radio frequency sputtering to a thickness of 2μm, after which $TiO_2$ and $ZrO_2$ were vapor-deposited thereon by means of an electron beam to a film thickness of 6500 and 3000 angstroms, respectively, to form a laminated layer structure. Subsequently, gold (Au) was vapor-deposited onto this laminated layer structure to a thickness of 80 angstroms to provide a semi-transparent film electrode. On this film electrode, there was further vapor-deposited a protective film of $SiO_2$ by means of an electron beam to a thickness of 100 angstroms.

When an electric current of 10 volts was applied to this element with the gold electrode being in the positive polarity, while irradiating a pattern of ultraviolet light thereonto from the side of the $SiO_2$ protective film, there could be recorded a blue-colored image in accordance with the ultraviolet ray pattern. This image could be projected in an enlarged scale on a screen by the use of white light rays. The image did not change at all even in a state, wherein irradiation of the ultraviolet ray is stopped and the voltage value was made zero. Next, when an electric current of 10 volts was applied to this element with the gold electrode being in the negative polarity, while irradiating ultraviolet rays on the entire surface of the element, the image was promptly decolored.

For the sake of comparison, a comparative element was produced by using $CaF_2$ in place of $ZrO_2$.

By using these two kinds of elements, the variations in the color density of the image formed on these elements, when they were subjected to a current application of 30 volts under irradiation of ultraviolet ray of 10 μw/mm², were compared, the results of which are as shown in Tables 8 and 9 below.

sequentially vapor-deposited on the laminated layer structure to a film thickness of 3000 and 6000 angstroms, respectively, by means of an electron beam. Further, there was applied onto the surface of this laminated layer structure a mixture consisting of 1 part by weight of ethyl cellulose and 10 parts by weight of ZnO which has been treated for increased sensitivity to coloring matter with rose bengal, after which an aluminum electrode was vapor-deposited thereon.

When an electric current of 10 volts was applied to this element for 2 seconds across the aluminum and gold electrodes with the gold electrode being made the positive polarity, while projecting a light image from the side of the glass substrate, there could be obtained a blue-colored pattern in accordance with the light image pattern. This colored pattern did not change at all even after removal of the applied voltage. Next, when an electric current of 10 volts of a polarity opposite to that of the abovementioned electric current for the coloring was further applied to the element, while irradiating light rays over the entire surface of the element, the recorded blue pattern was extinguished quickly.

Separate from the abovementioned element, there was produced a comparative element in exactly the same procedure as above, with the exception that the ZnS layer was removed therefrom. When the parallel reflexibility of this comparative element was measured from the side of the glass substrate, and the result was compared with the above-described element construction, it was discovered that the parallel reflexibility in the display body according to the present invention had reduced from 35% to as low at 5%, and that the "appearance" had been remarkably improved for the reduced rate of the parallel reflexibility.

There were further prepared two kinds of specimen elements by exactly the same procedure as in the foregoing with the exception that transparent electrically

Table 8

| | Components Constituting Element | Time (sec) Voltage (V) | (At Time of Coloring) | | | | | | |
|---|---|---|---|---|---|---|---|---|---|
| | | | 0.5 | 1 | 2 | 5 | 10 | 20 | 50 |
| Invention | Nesa/ZnO/TiO$_2$/ZrO$_2$/Au/SiO$_2$ | 10 | 0 | 0 | 0.1 | 0.2 | 0.3 | 0.4 | 0.5 |
| Comparison | Nesa/ZnO/TiO$_2$/CaF$_2$/Au/SiO$_2$ | 10 | 0 | 0 | 0 | 0 | 0.1 | 0.1 | 0.2 |

Table 9

| | Components Constituting Element | Time (sec) Voltage (V) | (At Time of Decoloring) | | | | | | |
|---|---|---|---|---|---|---|---|---|---|
| | | | 0 | 0.5 | 1 | 2 | 5 | 10 | 20 | 50 |
| Invention | Nesa/ZnO/TiO$_2$/ZrO$_2$/Au/SiO$_2$ | 10 | 0.5 | 0.4 | 0.2 | 0.1 | 0 | — | — | — |
| Comparison | Nesa/ZnO/TiO$_2$/CaF$_2$/Au/SiO$_2$ | 10 | 0.5 | 0.5 | 0.4 | 0.3 | 0.2 | 0.1 | 0.1 | 0.1 |

(NOTE)
Values of the color density have been determined in accordance with Example 4.

As will be apparent from the above Tables, it is observed that the use of the particular materials as enumerated above for the auxiliary electrochromic layer of the present invention makes it possible to quickly perform coloring and decoloring of the image formed on the element.

Example 8

Onto a glass substrate, ZnS was vapor-deposited to a thickness of 450 angstroms by means of an electron beam, and then gold was also vapor-deposited thereon to a thickness of 100 angstroms by the use of a resistively heated molybdenum board so as to form a laminated layer structure. Thereafter, $ZrO_2$ and $WO_3$ were conductive thin films of $In_2O_3$ (containing 5 wt.% of $SnO_2$) and $SnO_2$ (containing 5 wt.% of $Sb_2O_3$) were used in place of the abovementioned ZnS and Au layers. After recording light image patterns on these two elements, when an electric current of an opposite polarity was applied for decoloring, there was formed as brown-colored pattern in accordance with the already recorded blue-colored pattern, whereby the light image could not be extinguished perfectly. The reason for this phenomenon is that $In_2O_3$ and $SnO_2$ per se were colored by the current application, hence it is difficult to record separate light images for two times or more. On the other hand, in the element construction using ZnS and Au, as gold is never colored by the current application, decoloring can be done perfectly. As the result, there could be recognized no deterioration of the element at all even after repetition of the coloring and decoloring operations of light image patterns over 1000 times or more.

Example 9

Onto a glass substrate, $CeO_2$, Au, $BaTiO_3$, $WO_3$, Au, and ZnS were sequentially vapor-deposited to a film thickness of 450, 100, 3000, 6500, 100, and 450 angstroms, respectively, to form a laminated layer structure. (The gold layer was vapor-deposited by means of a resistively heated molybdenum board.)

When an electric current of 5 volts was applied across the two gold electrodes in such a manner that the electrode to the side of the $BaTiO_3$ layer may be in the positive polarity, there was recorded a blue-colored pattern. This blue-colored pattern was quickly extinguished by a current application in the opposite polarity. The light transmission factor of this element at the time of the decoloring was found to have increased from 30 to 70% in comparison with the case wherein $CeO_2$ is not used as the reflection reducing coating.

Next, $BaTiO_3$, $WO_3$, Au, and ZnS were sequentially vapordeposited and laminated to a film thickness of 3000, 6500, 100, and 450 angstroms, respectively on a transparent, electrically conductive substrate produced by vapor-depositing $In_2O_3$ (containing 5 wt.% of $SnO_2$) on a glass substrate followed by heat-treatment. The thus produced display body for comparison purposes was subjected to a deterioration test. The transmission factor at the time of decoloring after 100 repeated coloring operations for 100 was found to be 70% with the display body of the present invention using gold for both electrodes, the value of which was exactly the same as that prior to the current application, i.e., no deterioration, while, with the display body using $In_2O_3$, the transmission factor decreased from 75 to 20%. This is due to coloring of $In_2O_3$ when the applied current is in the polarity for the decoloring.

Example 10

Onto a glass substrate heated to 200° C, $ZrO_2$ was vapor-deposited to a thickness of 500 angstroms by means of an electron beam, after which the temperature of the substrate was lowered to a room temperature. Then, Au, a mixture of $Ta_2O_5$ and $ZrO_2$ (molar ratio of 1/3), and $WO_3$ were sequentially vapor-deposited onto the substrate to a film thickness of 100, 3000, and 6500 angstroms, respectively, to form a laminated layer structure. Thereafter, a mixture consisting of 10 parts by weight of CdS and 1 part by weight of ethyl cellulose was coated on this laminated layer structure to a film thickness of 15 μm, followed by vapor-deposition in laminar form of Ag and ZnS to a film thickness of 200 and 400 angstroms, respectively.

When an electric current of 20 volts was applied to the thus obtained element with the gold electrode being in the positive polarity, while irradiating a light image pattern from the side of the silver electrode, there was recorded a blue-colored pattern in accordance with the light image pattern. This pattern did not change at all even after removal of the applied voltage. Upon application of an electric current in the opposite polarity to the current applied for the coloring, while irradiating light over the entire surface of the element, the light image was quickly extinguished. The parallel reflexibility of the element from the side of the glass substrate decreased to as low as 5% or so in comparison with the element of the exactly same structure as above except for the absence of ZnS, which was a reduction of 30% or more. It was found out that, in the display body having no reflection reducing coating of ZnS at the silver electrode side, irradiation of a light image pattern having a brightness twice as high as that of an ordinary light image pattern was necessary for obtaining a recorded image of the same color density by the coloring operation done by the same voltage application in the same time period. Further, in the display body, wherein a transparent conductive film of $In_2O_3$ (containing 5 wt.% of SnO) is used in place of the gold layer, it was found out that the image pattern turned to brown by application of the current in the same polarity as that for the decoloring as is the case with Example 8 with the consequence that repetitive coloring and decoloring operations become difficult. In contrast to this, the display element according to the present invention did not show any deterioration whatsoever after repetition of the operations over 1000 times.

Example 11

Onto a transparent, electrically conductive glass substrate, a CdS coating of 3 μm thickness formed by the C.V.D. (Chemcial Vapor Deposition) method, after which $MoO_3$, $TiO_2$, Au, and MgO were sequentially vapor-deposited by means of an electron beam to a film thickness of 6500, 3000, 100, and 700 angstroms, respectively, so as to form a laminated layer structure.

When an electric current of 7 volts was applied to the thus obtained display element with the gold electrode side being in the positive polarity, while irradiating a light image pattern from the side of the glass substrate, there was recorded a blue-colored pattern in accordance with the irradiated light image pattern. This pattern did not change at all even after removal of the applied voltage. Next, when a current application in the opposite polarity to that of the current for the coloring is carried out, while irradiating light over the entire surface of the element, this recorded image was quickly extinguished.

It was found out that, in comparison with a display element of the same construction as mentioned above, except for the non-existence of the reflection reducing coating of MgO, the element of the present invention could increase its light transmission factor form 25 to 65% at the time of the decoloring, and an image of high contrast could be obtained.

Example 12

A dispersion liquid of pulverized $WO_3$ in toluene as a solvent containing therein 10% of Novolac type phenolic resin was thinly coated to a film thickness of 5μm onto a "nesa" electrode, which had already been coated with a thin film of CdS to a thickness of 1μmm or so by the C.V.D. (Chemical Vapor Deposition) method, by the dipping method at a pulling speed of 3 cm/min., after which it was dired perfectly. Then, $Ta_2O_5$ was vapor-deposited on this "nesa" electrode to a film thickness of 4000 angstroms by means of an electron beam, followed by vapor-deposition of gold to a film thickness of 200 angstroms for reflection prevention. Finally, a Mylar film (a trademark for a polyester film produced by E.I. du Pont de Nemours & Co., U.S.A.) was coated on this laminar structure as a protective film to obtain the display element.

When a d.c. voltage of 15 volts was applied across the two electrodes, while irradiating a light image from the side of the glass substrate, the quality of the image as observed from the opposite side in correspondence to the light image was found to be 20 lines/mm or so, and the image pattern was colored in blue with a light yellow background. When a d.c. voltage of an opposite polarity was applied, while irradiating light from the side of the glass substrate over the entire surface of the element, the image was quickly extinguished. The brightness of the illuminating light was 100 to 200 lux.

When the density between the colored pattern and the background in this element was compared, it was found out that the former was $\Delta D = 1.5$, and the latter $\Delta D = 2.0$. For the sake of comparison, a comparative element was prepared by the exact same procedure as above with the exception that the abovementioned $WO_3$ layer was provided by vapor-deposition, and this element was tested for electrochromy. It was found out that the density of the colored pattern remained the same, i.e., $\Delta D = 1.5$, while the density of the background was $\Delta D = 0.6$.

As the result, it was discovered that, according to the display element of the present invention, there is the least coloring of the background, owing to which an image pattern of a good contrast could be obtained.

Example 13

Onto a "nesa" electrode, selenium (Se) was vapor-deposited in a vitreous form, after which a dispersion liquid of pulverized $\beta$-$Al_2O_3$ in alcohol solvent containing 10% of ethyl cellulose was coated thereon to a thickness of 5 $\mu$m and sufficiently dried. Over this coating, $MoO_3$ was vapor-deposited to a film thickness of 6000 angstroms by means of an electron beam, and then gold was further vapor-deposited thereon to a thickness of 200 angstroms or below to treat the surface for reflection prevention. Finally, a Mylar film was adhered thereon to produce the element.

Similar results were obtained on the coloring and decoloring operations in the same manner as done in the foregoing Examples.

Example 14

In the element construction in Example 12, $Ta_2O_5$ was replaced by a mixture of $CaTiO_3$ and $SrTiO_3$ (mol ratio of 1/1) as the vapor-deposited film. Also, the photosemiconductive layer was made of a mixture of CdS and ethyl cellulose. Thus, the element was produced in exactly the same manner as in Example 12. The element thus produced also showed similar results as in Example 12.

Example 15

In the element construction in Example 12, $Ta_2O_5$ was replaced $V_2O_5$ for the vapor-deposited film. Also, the photo-semiconductive layer was made of a mixture of ZnO and ethyl cellulose. Thus, the element was produced in exactly the same manner as in Example 12. The element also showed similar results as in Example 12.

In Examples 12 to 15, it was recognized that, by the inclusion of the binder layer, the light intercepting effect came out, whereby the image contrast between the colored pattern and the background which is less liable to be colored due to extraneous light was high in comparison with the conventional elements. However, when the external light is very bright, the contrast of the colored pattern with respect to its background becomes lowered. That is, when the input light pattern has a luminosity of 10 lux or below, the pattern contrast showed almost the same as that of the pattern formed by input of a light pattern having a luminosity of 100 lux or above. Accordingly, when the external light is very bright, i.e., 200 lux and above, it is preferably that the input light for the pattern be equal to or higher than the external light, because an input light pattern with very low luminosity will not help exhibit the advantage of the present invention.

Example 16

Cadmium sulfide (CdS) was formed on the "nesa" electrode to a thickness of 1.2 $\mu$m by means of the C.V.D. (Chemical Vapor Deposition) method. On this CdS coating, $WO_3$ and $Ta_2O_5$ were sequentially vapor-deposited to a film thickness of 5000 angstroms to form a laminated layer structure, after which a mixture composed of 9 parts by weight of CdS powder and 1 part by weight of ethyl cellulose was applied onto this laminated layer structure to a thickness of 10 $\mu$m. Finally, this layered structure was held between a pair of opposing aluminum electrodes, thereby obtaining an element for image display.

When a light image was formed on this element, and then an electric current of 20 volts was applied across the "nesa" electrode and the aluminum electrode with the side of the aluminum electrode being in the positive polarity, there could be recorded a colored pattern in blue in conformity to the light image pattern. This image did not change at all even after removal of the light and voltage applied thereto. The resolution of this element at this time was 516 lines/mm. Also, when a current of 20 volts was applied thereto with the aluminum electrode side being made the negative, while irradiating light over the entire surface of the element, the colored pattern was quickly extinguished.

For the sake of comparison, two kinds of comparative elements were produced, of which one was coated with a single photo-semiconductive layer of CdS by the CVD method, and the other was coated with a mixture of CdS and a binder. The resolving power of these elements were 418 lines/mm and 75 lines/mm, respectively. From this, it will be understood that the element according to the present invention has a higher resolution than the comparative elements.

Example 17

An image display element was produced in the exact same manner as in Example 16 above with the exception that $SrTiO_3$ was used at the vapor-deposited layer in place of $Ta_2O_5$, and ZnO powder was used in place of CdS powder.

When a light image was formed on the layer containing therein ZnO powder, and then an electric current of 10 volts was applied across the "nesa" electrode and the aluminum electrode with the latter side being in the positive polarity, there could be recorded a colored pattern in blue in accordance with the light image. This image did not change at all even after removal of the light and voltage applied thereto. The resolution of this element at this time was 482 lines/mm. When an electric current of 10 volts was applied to this element with the aluminum electrode side being in the positive polarity, while irradiating light over the entire surface of the element, the colored pattern was quickly extinguished.

For the sake of comparison, two kinds of elements were produced, of which one was coated with a single photoconductive layer of CdS by the C.V.D. method, and the other is provided with such layer composed of a mixture of ZnO and a binder. The resolution of these elements was 418 lines/mm and 65 lines/mm, respectively. From this, it will be understood that the element according to the present invention is higher in its resolution than that of the comparative elements.

Example 18

Zinco oxide (ZnO) was coated on the "nesa" electrode to a thickness of 2000 angstroms by the sputtering method. After the ZnO coating was treated for increased sensitivity to coloring matter by the use of rose bengal, $ZrO_2$ and $WO_3$ were sequentially vapor-deposited onto this coating to a film thickness of 5000 angstroms by means of electron beam coating to form a laminated layer structure. Further, on this laminated layer structure, there was applied a mixture consisting of 9 parts by weight of ZnO powder and 1 part by weight of vinyl acetate to a thickness of 8 $\mu$m, after which the layered structure was held between a pair of opposing aluminum electrodes. Incidentally, the mixture was also treated for increased sensitivity to coloring matter with rose bengal.

When a light image pattern was formed on the layer containing therein the mixture of ZnO powder and a binder, and then an electric current of 8 volts was applied with the aluminum electrode side being in the negative polarity, there could be recorded a blue colored pattern in accordance with the light image pattern. This recorded image pattern did not change at all even after removal of the light and voltage applied. The resolution of this element was 720 lines/mm. Further, when an electric current of 8 volts was applied to the element with the aluminum electrode side being made the positive polarity, while irradiating light over the entire surface of the element, the recorded pattern was quickly extinguished.

For the sake of comparison, two kinds of comparative elements were produced, of which one was coated with a single photoconductive layer of ZnO by the sputtering method, and the other was coated with such layer composed of a mixture consisting of ZnO and a binder. The resolution of these elements was 581 lines/mm and 33 lines/mm, respectively. From this, it will be understood that the element of the present invention has a higher resolution than the comparative elements.

Example 19

Cadmium sulfide (CdS) was vapor-deposited onto a "nesa" electrode to a thickness of 3000 angstroms. Thereafter, $ZrO_2$ containing therein 10 mol % of $Y_2O_3$ and $WO_3$ were sequentially vapor-deposited on this coated "nesa" electrode to a film thickness of 3000 and 5000 angstroms to form a laminated layer structure. Thereafter, a mixture consisting of 9 parts by weight of ZnO powder and 1 part by weight of ethyl cellulose was further applied onto this layered structure to a thickness of 10 $\mu$m. Finally, the layered structure was held between a pair of opposing electrodes of aluminum. Incidentally, the mixture used was treated for increased sensitivity to coloring matter with rose bengal.

When a light image was formed on the layer of the element containing therein the mixture of ZnO powder and the binder, and then an electrical current of 10 volts was applied across the aluminum electrode and the "nesa" glass electrode with the aluminum electrode side being in the negative polarity, there could be recorded a blue-colored pattern in accordance with the light image pattern. This recorded pattern did not change at all even after removal of light and voltage applied. The resolution of the element at this time was 628 lines/mm. Further, when an electric current of 10 volts was applied to the element with the aluminum electrode side being in the positive polarity, while irradiating light over the entire surface of the element, the recorded pattern was quickly extinguished.

For the sake of comparison, two kinds of elements were produced, of which one was coated with a single photoconductive layer of CdS coated by vapor-deposition, and the other was coated with such layer composed of a mixture consisting of ZnO and the binder. The resolution of these comparative elements were 553 lines/mm and 65 lines/mm, respectively. From this, it will be understood that the element of the present invention is higher in its resolution than that of the comparative elements.

Example 20

A mixture of polyvinyl carbazole and 2,4,7trinitrofluorenone in tetrahydrofuran as the solvent (mol ratio of 1/1) was coated on "nesa" glass and dried to a film thickness of 0.4 $\mu$m. Thereafter, $WO_3$ was vapor-deposited on this coated glass by means of electron beam coating to a film thickness of 5000 angstroms, followed by vapor-deposition of $RbAg_4I_5$ by the resistive heating method to a film thickness of 3000 angstroms. Further, on this laminated layer structure, there was applied a mixture consisting of 9 parts by weight of CdS powder and 1 part by weight of ethyl cellulose in ethyl alcohol as the solvent to a thickness of 10 $\mu$m. Finally, the thus formed layered structure was held between a pair of opposing aluminum electrodes.

When a light image pattern was formed on this element, and then an electric current of 30 volts was impressed across the aluminum electrode and the "nesa" glass electrode with the aluminum electrode side being in the positive polarity, there could be recorded a blue-colored pattern in accordance with the light image pattern. The recorded pattern did not change at all even after removal of the light and voltage applied. The resolution of this element was 615 lines/mm. Further, when an electric current of 30 volts was applied with the aluminum electrode side being in the negative polarity, while irradiating light over the entire surface of the element, the recorded pattern was quickly extinguished.

For the sake of comparison, an element having a single photo-conductive layer was produced, and subjected to the same recording operation as mentioned above. It was found that the resolution of the obtained colored pattern was considerably lowered in comparison with the element according to the present invention.

Example 21

Onto a "nesa" electrode, $WO_3$ was vapor-deposited to a thickness of 5000 angstrom, after which $Ta_2O_5$ was vapor-deposited on this $WO_3$ coating to a thickness of 5000 angstroms by means of electron beam coating. Further, onto this laminated layer structure, there was coated a mixture consisting of 9 parts by weight of toluene as the solvent, 0.5 part by weight of vinyl acetate, 0.5 part by weight of acryl, and 9 part by weight of CdS powder so that the film thickness thereof after drying may become 20 μm. Finally, this layered structure was held between a pair of aluminum electrodes.

When a light image was formed on the photoconductive layer, and then an electric current of 50 volts was impressed with the aluminum electrode side being in the positive polarity, there could be recorded a colored pattern in black in accordance with the light image pattern. The recorded image did not change at all even after removal of the light and voltage applied. The resolution of this element in this condition was measured to be 32 lines/mm. Further, when an electric current of 50 volts was applied with the aluminum electrode side being in the negative polarity, the recorded pattern was extinguished.

For the sake of comparison, a comparative element was produced, wherein a $CaF_2$ layer was substituted for the $Ta_2O_5$ layer in the abovementioned element structure was produced.

When an electric current of 50 volts was applied to this element with the aluminum electrode side being in the negative polarity, there could be recorded a black-colored pattern in accordance with the light image pattern. Also, when an electric current of 50 volts was applied thereto with the aluminum electrode side being made the positive polarity, while irradiating light over the entire surface of the element, the recorded pattern was extinguished. The resolution of this element was 20 lines/mm.

Example 22

Gold (Au) was vapor-deposited by the resistive heating method onto a glass plate to a thickness of 100 angstroms, and $WO_3$ to a thickness of 5000 angstroms. Onto the thus deposited film coating, $Ta_2O_5$ was vapor-deposited to a thickness of 5000 angstroms by means of electron beam coating to form a laminated layer structure. Thereafter, a mixture consisting of 9 parts by weight of ZnO powder and 1 part by weight of ethyl cellulose in 9 parts by weight of ethyl alcohol as the solvent was applied to this laminated layer structure to a coating thickness after drying of 10 μm. Finally, this layered structure was held between a pair of opposing aluminum electrodes.

When a light image was formed on the photoconductive layer of ZnO, and then an electric current of 10 volts was applied to the element with the aluminum electrode side being in the positive polarity, there was recorded a colored pattern in purple in accordance with the light image pattern. The recorded image did not change at all even after removal of the light and voltage applied. The measured resolution of this element in the abovementioned condition was 34 lines/mm. Further, when an electric current of 10 volts was applied to the element with the aluminum electrode side being in the negative polarity, while irradiating light over the entire surface of the element, the recorded pattern was extinguished.

For the sake of comparison, there was produced a comparative element, wherein an $SiO_2$ layer was substituted for the $Ta_2O_5$ layer in the abovementioned element construction.

When an electrical current of 10 volts was applied to this element with the aluminum electrode side being in the negative polarity, there was recorded a purple colored pattern in accordance with the light image pattern. Further, when an electric current of 10 volts was applied to the same element with the aluminum electrode side being in the positive polarity, while irradiating light over the entire surface of the element, the recorded pattern was extinguished. The resolution of this element was measured to be 21 lines/mm.

Example 23

In the electrolytic layer of Example 22 above, $ZrO_2$ was used in place of $Ta_2O_5$, and the resolution of the element was measured (the film thickness and applied voltage value were exactly the same as those of Example 22). It was found that, in the element construction of $Au/WO_3/ZrO_2/ZnO/Al$, the resolution was 30 lines/mm. On the other hand, in the construction of the comparative element of $Au/WO_3/MgF_2/ZnO/Al$, the resolution was 21 lines/mm.

Example 24

Cadmium sulfide (CdS) was vapor-deposited on a "nesa" glass to a thickness of 1.4 μm by the chemical vapor deposition method, on which coated film there were further vapor-deposited $SrTiO_3$ and $WO_3$ in the sequence mentioned by means of electron beam coating to a film thickness of 5000 angstroms. The thus prepared laminated layer structure was then held between a pair of opposing electrodes of aluminum.

When a light image was formed on the CdS photoconductive layer, and then an electric current of 2 volts was applied to the element with the aluminum electrode side being made the negative polarity, there was recorded a black-colored pattern in accordance with the light image pattern. This image did not change at all even after removal of the light and voltage applied. In this state, the resolution of the element was measured to be 308 lines/mm. Further, when an electric current of 2 volts was applied to the element with the aluminum electrode side being in the positive polarity, while irradiating light over the entire surface of the element, the reocrded pattern was extinguished.

For the sake of comparison, a comparative element was produced, wherein $CaF_2$ was substituted for $SrTiO_3$ in the abovementioned construction was produced. When an electric current of 2 volts was applied to this element with the aluminum electrode said being in the positive polarity, there was recorded a black-colored pattern in accordance with the light image pattern. Also, when an electric current of 2 volts was applied to this element with the aluminum electrode side being in the negative polarity, while irradiating light over the entire surface of the element, the recorded pattern was extinguished. The resolution of this element was measured to be 211 lines/mm.

What is claimed is:

1. An electrochromic device comprising a pair of opposed electrodes, at least one of which is light transmissive, having disposed therebetween a laminated electrochromic layer consisting essentially of a metal oxide selected from the group consisting of $WO_3$, $MoO_3$ and $TiO_2$, and a laminated auxiliary electrochromic layer consisting essentially of a compound of a metal; wherein said metal oxide and said metal compound are selected such that the difference in electronegativity between the metal of said metal oxide and a metal of said metal compound is not greater than 0.4; and wherein said metal compound is selected from the group consisting of $ZrO_2$, $Ta_2O_5$, $Nb_2O_5$, $V_2O_5$, $TiO_2$, $BaTiO_3$, $CaTiO_3$, $SrTiO_3$, $Y_2O_3$-containing $ZrO_2$, AgI, $Ag_2S$, AgSI, $Ag_3SBr$, $Ag_6I_4WO_4$, and mixtures thereof.

2. The electrochromic device of claim 1 wherein said electrochromic layer and said auxiliary electrochromic layer comprise vapor-deposited layers.

3. The electrochromic device of claim 2 wherein the thickness of said electrochromic layer is from 500 Angstroms to 10μm, and wherein the thickness of said auxiliary electrochromic layer is from 100 Angstroms to 10μm.

4. The electrochromic device of claim 2 wherein the thickness of said electrochromic layer is from 2,000 Angstroms to 1μm, and wherein the thickness of said auxiliary electrochromic layer is from 1,000 Angstroms to 1μm.

5. The electrochromic device of claim 1 wherein the thickness of said electrochromic layer is from 500 Angstroms to 10μm, and wherein the thickness of said auxiliary electrochromic layer is from 100 Angstroms to 10μm.

6. The electrochromic device of claim 1 wherein the thickness of said electrochromic layer is from 2,000 Angstroms to 1μm, and wherein the thickness of said auxiliary electrochromic layer is from 1,000 Angstroms to 1μm.

7. The electrochromic device of claim 1 wherein said light transmissive electrode is composed of a light-transmitting film of an electrically-conductive metal oxide.

8. The electrochromic device of claim 7 wherein said metal oxide is selected from the group consisting of tin oxide and indium oxide.

9. The electrochromic device of claim 1 wherein said light transmissive electrode is composed of a semi-light-transmitting metal thin film.

10. The electrochromic device of claim 9 wherein said metal thin film is composed of a precious metal and has a thickness of from 50 to 200 Angstroms.

11. The electrochromic device of claim 1 wherein said light transmissive electrode is composed of a metal thin film having a reflection reducing coating thereon.

12. The electrochromic device of claim 1 wherein said light transmissive electrode is composed of a precious metal thin film having coated thereon a thin film of a metal compound having a refractive index of from 1.3 to 3.0 and a thickness of from 100 to 1200 Angstroms, said precious metal thin film having a thickness of from 50 to 200 Angstroms.

13. The electrochromic device of claim 12 wherein said metal compound is selected from the group consisting of $ZnS$, $ZrO_2$, $TiO_2$, $SiO$, $SiO_2$, $Nb_2O_5$, $MgO$, $MgF_2$, $CaF_2$, $Al_2O_3$, $Bi_2O_3$ and $CeO_2$.

14. The electrochromic device of claim 12 wherein said metal compound has a refractive index of 2.0 and wherein the coating of said metal compound has a thickness of from 400 to 600 Angstroms.

15. The electrochromic device of claim 1 wherein the electrode which is not light-transmissive is composed of a metal.

16. The electrochromic device of claim 15 wherein said metal is silver or aluminum.

17. The electrochromic device of claim 1 further comprising a photosemiconductive layer between one of said electrodes and said electrochromic layer.

18. The electrochromic device of claim 17 wherein said photosemiconductive layer is composed of a member selected from the group consisting of oxides, sulfides and selenides of zinc and cadmium.

19. The electrochromic device of claim 18 further comprising a light-intercepting layer composed of a compound in a binder therefor, said compound being selected from the group consisting of said metal oxide, said metal compound and oxides, sulfides and selenides of zinc and cadmium.

20. The electrochromic device of claim 19 wherein said light-intercepting layer is coated on said photosemiconductive layer.

21. The electrochromic device of claim 17 wherein said photosemiconductive layer is composed of a member selected from the group consisting of zinc oxide and cadmium sulfide.

22. The electrochromic device of claim 1 further comprising two photosemiconductive layers between one of said electrodes and said electrochromic layer and also between the other of said electrodes and said auxiliary electrochromic layer.

23. The electrochromic device of claim 22 wherein said photosemiconductive layers are composed of a member selected from the group consisting of oxides, sulfides and selenides of zinc and cadmium.

24. The electrochromic device of claim 22 wherein said photosemiconductive layers are composed of a member selected from the group consisting of zinc oxide and cadmium sulfide.

25. The electrochromic device of claim 22 further comprising a light-intercepting layer composed of a compound in a binder therefor, said compound being selected from the group consisting of said metal oxide, said metal compound and oxides, sulfides and selenides of zinc and cadmium.

26. The electrochromic device of claim 1 further comprising a light-intercepting layer composed of a compound in a binder therefor, said compound being selected from the group consisting of said metal oxide, said metal compound and oxides, sulfides and selenides of zinc and cadmium.

27. The electrochromic device of claim 26 wherein said light-intercepting layer is coated on said electrochromic layer.

28. The electrochromic device of claim 26 wherein said light-intercepting layer is coated on said auxiliary electrochromic layer.

* * * * *